United States Patent [19]

Schlaich et al.

[11] Patent Number: 4,673,309

[45] Date of Patent: Jun. 16, 1987

[54] METHOD AND APPARATUS FOR ANCHORING CABLES OF HIGH-TENSILE STEEL WIRE

[76] Inventors: Jörg Schlaich, Hagenbergsteige 63d, 7000 Stuttgart 1; Rudolf Bergermann, Laustrasse 60, 7000 Stuttgart 70, both of Fed. Rep. of Germany

[21] Appl. No.: 685,705

[22] Filed: Dec. 24, 1984

[30] Foreign Application Priority Data

Sep. 25, 1984 [DE] Fed. Rep. of Germany ....... 3435118

[51] Int. Cl.$^4$ .............................................. F16G 11/05
[52] U.S. Cl. ................................... 403/265; 403/268; 403/272; 403/275; 164/108; 164/461; 24/115 M; 24/122.6
[58] Field of Search ................... 164/108, 461, 477; 403/265, 266, 268, 269, 270–272, 373, 374, 276, 275, 260; 24/122.6, 136 L, 115 M

[56] References Cited

U.S. PATENT DOCUMENTS

| | | | |
|---|---|---|---|
| 783,631 | 2/1905 | Greger | 24/122.6 |
| 1,577,003 | 3/1926 | Sunderland | 403/272 |
| 1,680,347 | 8/1928 | Sunderland | 403/272 |
| 2,803,486 | 8/1957 | Larson et al. | |
| 2,934,364 | 4/1960 | Conversy | 403/275 |
| 3,409,951 | 11/1968 | Morieras | 403/275 |
| 3,468,569 | 9/1969 | Ballard et al. | 24/122.6 |
| 3,494,005 | 2/1970 | Baker et al. | 24/122.6 |
| 3,507,949 | 4/1970 | Campbell | 403/268 |
| 3,660,887 | 5/1972 | Davis | 403/268 |
| 4,276,531 | 7/1981 | McKenzie | 403/275 |
| 4,295,250 | 10/1981 | Dupuy | 403/275 |
| 4,317,640 | 3/1982 | Peeling | 403/268 |

*Primary Examiner*—Cornelius J. Husar
*Assistant Examiner*—Todd G. Williams
*Attorney, Agent, or Firm*—Jones, Tullar & Cooper

[57] ABSTRACT

A method and an apparatus are described for anchoring cables, bundles of parallel or standard wire, or the like, of preferably high-tensile steel wire. At least one end of the cable or the like is introduced into a fixed anchoring socket and sealed with a pourable material. In order for the anchoring apparatus to have improved properties under static stress, and in particular under great dynamic stress, without requiring additional structural safety features, while enabling lower-cost manufacture, it is provided that the bundle be twisted and the bundle or cable opened for some distance from the associated end in such a manner that the wires or strands extend uniformly all the way through the conical inner region of the anchoring socket. Further, a metallic casting material is poured into the anchoring socket between the opened wires or strands, and a direct metal-to-metal joint is established between the metallic casting material and the wires or strands of the cable or bundle.

15 Claims, 11 Drawing Figures

METHOD AND APPARATUS FOR ANCHORING CABLES OF HIGH-TENSILE STEEL WIRE

FIELD OF THE INVENTION

The present invention relates to a method and an apparatus for anchoring cables, bundled wires and strands, or the like of preferably high-tensile steel, in which at least one end of the cable or the like is introduced into an anchoring socket and therein embedded into a pourable material.

According to the present invention, cables of all types can be used, in particular pre-stranded wire, so-called spiral cables, and bundles in the form of parallel-wire bundles and parallel-strand bundles. Such bunches or cables are intended for use as bracing or tension members in cable-stayed bridges, staying means for poles, towers, platforms or the like, and so forth. In these structures, the dynamic stress the cables or bundles must withstand is extremely great in comparison with the static stress produced by the inherent weight of the structure. For instance, in cable-stayed bridges, the varying load component (imposed by railroad trains, for example) is very great; the same applies for the dynamic stress on poles, towers, platforms and so forth imposed by wind and/or waves and the like.

BACKGROUND OF THE INVENTION

In the case of spiral cables, anchoring is known in which the cables are held firmly, in their twisted form, in an anchoring socket by means of a metallic costing material. In the case of parallel-wire and parallel-strand bundles, it it known to spread or bend apart the parallel wires or strands inside an anchoring socket and to anchor them by means of a casting material comprising steel balls and synthetic resin. Another form of anchoring or parallel-wire or parallel-strand bundles is the firm retention of the individual wires or strands in anchoring sockets by wedges. However, these parallel-wire bundles must additionally be held together (banded) over their whole length. A common feature of these known metallic anchoring means is that they fail to withstand varying stress in the area of the base of the cable head or cable anchoring socket, because the casting material is already strained beyond its yield strength under working loads, and friction is thereby produced between the cable or the individual wires or strands and the casting material; with the concomitant action of oxygen, the result is frictional corrosion. In other words, the cable in question tears in the anchored area after a particular number of dynamic stress cycles. The stress amplitudes attainable for two million load cycles with these spiral cable anchors are therefore only about 150 N/mm$^2$, yet in the areas of use discussed above it is desirable for the permissable stress amplitudes to be approximately 250–300 N/mm$^2$, in order to be able to fully exploit the cables for static loads. Although in the other known special forms of anchoring of parallel-wire or parallel-strand bundles using steel balls or wedges and a supplementary pouring of resin material, it is possible to attain wider stress ranges, nevertheless these anchorings are very complicated and expensive in terms of both their application and their construction. Furthermore, such parallel-wire and parallel-strand bundles are not sufficiently compact, so provisions for holding the bundle together must be made over its entire length, which again represents increased expense. Still further, resin is not fireproof.

OBJECT AND SUMMARY OF THE INVENTION

It is accordingly a principal object of the present invention to provide a method and an apparatus for anchoring cables, bundled wires or strands, or the like of the above-discussed type, with which the anchoring has improved properties under static and especially under great dynamic stress, without additional structural safety features, and yet can be manufactured at less expense.

In a method of the above-noted type, this object is attained by providing that the ends of the cable that are fixed in the anchoring socket are opened and passed uniformly through the conical inner area of the socket, that a metallic casting material is poured into the opened wires or strands and that a direct metal-to-metal joint is established between the casting material and the wires or strands. In an apparatus of the above-noted type, this object is attained by providing that the opening cone of the opened end of the cable is approximately identical to the inner cone of the anchoring socket, and that a metal casting body is inserted between the opened wires or strands and forms a direct metal-to-metal joint with them.

By means of the provisions according to the invention, the individual wires or strands are spaced apart uniformly, with the slight twisting of the cable or bundle causing the individual wires or strands to open up in a straight line and in a conical pattern, without bending, in a uniform manner over the entire area that will later receive the casting material. A further advantage of this twisting or laying of the cable is that the bundle not only has sufficient crosswise stability (cohesion) but is simultaneously disposed so compactly that a standard coating of paint provides satisfactory protection against external corrosion outside the anchoring. Furthermore, there is a precisely defined area for the casting material or for the finished socket. In addition, the direct metal-to-metal bond between individual wires or strands and the casting material means that greater forces can be transmitted per unit of surface area, so that the ratio of the wire or strand surface to the wire or strand cross section can be reduced. This means that with an identical anchoring length, thicker wires or strands may be used, and/or the anchoring length, and hence the anchoring socket, can be made shorter in length. The socket is therefore made relatively short and wide, which imparts a resilient action to this socket. Thus, in the working-load range, it provides an elastically resilient support of the bundled wires or strands, without relative movement between the cast material and wires. This is an important precondition for great fatigue strength on the part of the anchor, because friction among the individual wires or strands and the cast material is prevented. The dimensions of the socket are suitably ascertained such that even in the ultimate load range, with severe crosswise deformation (uniform elongation) of the wires under yield stress, the casting material at the base of the cone is deformed such that the crosswise pressure upon the wires or strands is maintained, and the metal-to-metal bond between the wire or strand and the casting material is not overloaded.

In a preferred exemplary embodiment of the present invention, a perforated template is provided at the back and/or front end of the anchoring socket, in order to keep the wires or strands spaced apart by a precisely defined, uniform distance in this area or areas. As a result, the cast cone inside the socket can be manufactured more accurately in terms of its length and its grip on the individual wires or strands. In this manner, it is also assured that the wires or strands are anchored in the same section, or uniformly, so that relative movement between them is avoided. Advantageously, the perforated template used in the base area of the anchoring socket simultaneously acts as a sealing element for the anchoring socket while the viscous casting material is being introduced.

Further details and embodiments of the invention will become apparent from the ensuing description of an exemplary embodiment of the invention taken in conjunction with the drawings.

BRIEF DESCRIPTION OF THE DRAWINGS

FIG. 1 is a schematic side view of an apparatus for anchoring cables, bundled wires or strands, or the like;

DESCRIPTION OF THE PREFERRED EMBODIMENT

Figure 2:
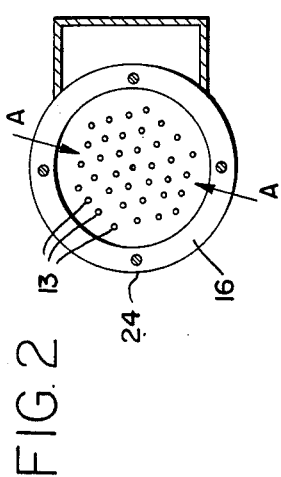
FIG. 2 is a schematic sectional view taken along the line II—II of FIG. 1.

The anchoring apparatus 11 shown in the drawing serves to anchor cables, in particular laid cables or spiral cables, bundles of parallel wires or parallel strands, or the like, such as are used as staying or tension elements, for instance for cable-stayed bridges, braces for poles, towers platforms, and so forth. Such cables must be able to withstand not only the loads imposed by inherent weight but also by dynamic loads, in particular, such as those imposed by traffic on bridges, wind, waves, and so forth. An anchoring apparatus 11 of this kind is attached to the cable or bundle at one or both ends.

Figure 8:
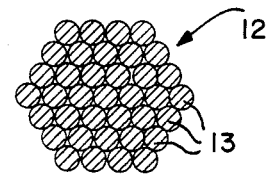
FIG. 8, on an enlarged scale, is a section taken along the line VIII—VIII of FIG. 1.

In the exemplary embodiment shown in the drawing, an apparatus 11 serves to anchor a parallel-wire bundle 12 as shown, here comprising 37 individual wires 13 having, for example, a diameter of 7 mm. As will be explained below, these wires are twisted with a particular lay length in the area between their two ends, but the ends themselves are not twisted. The parallel-wire bundle 12 has the hexagonal configuration shown in FIG. 8, representing the most compact possible configuration.

Figure 1:
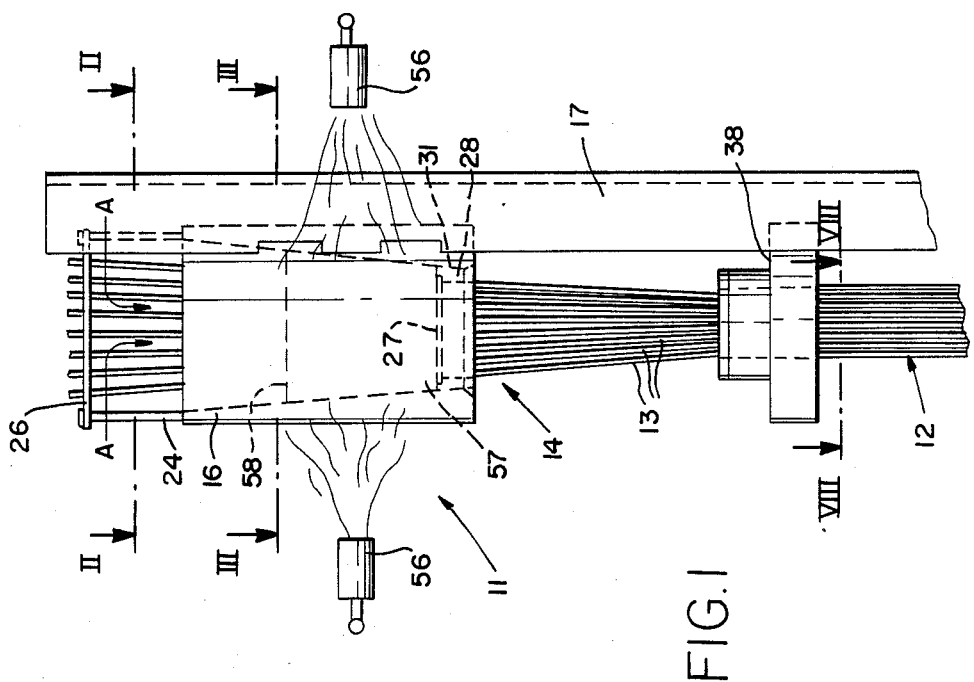
Figure 4:
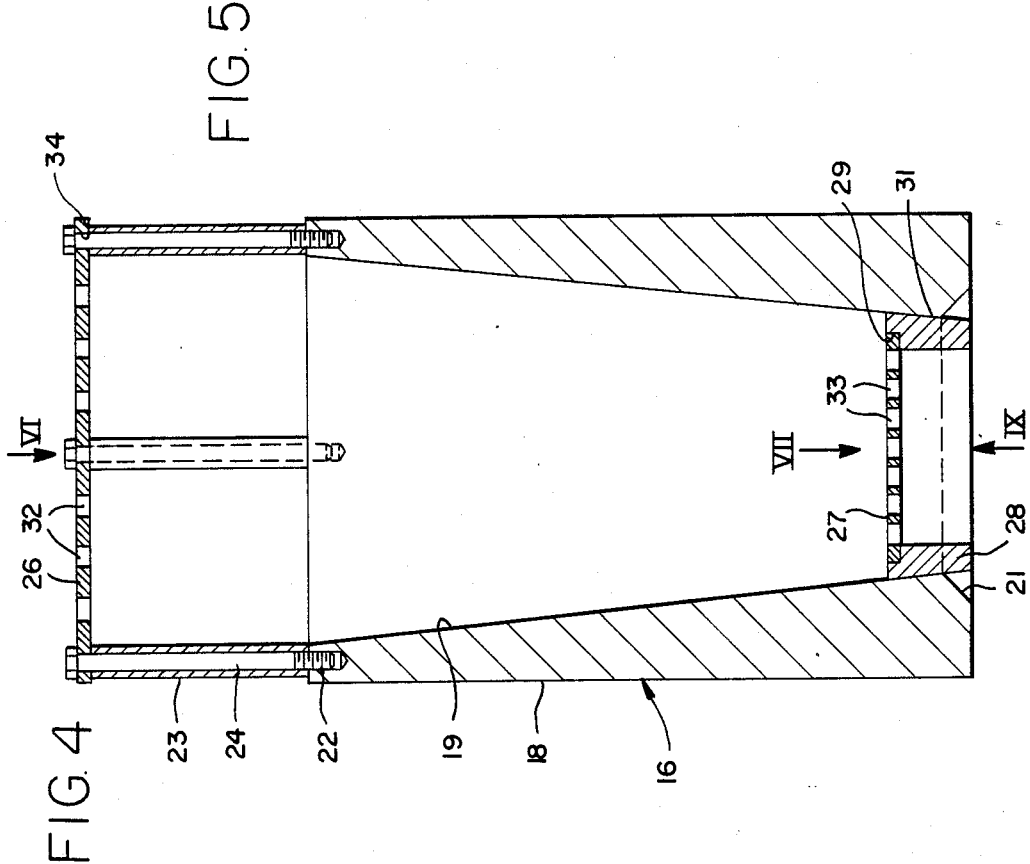
FIG. 4, on an enlarged scale, is a longitudinal section taken through an anchoring socket having an upper and a lower perforated template, in the apparatus shown in FIG. 1.

As shown in FIG. 1, the apparatus 11 has an anchoring socket 16, which is secured to a stationary structural part 17 for preparing and effecting the anchoring the bundle. As shown in FIG. 4, the anchoring socket 16 has a cylindrical outer circumference 18 and a conically extending inside circumference 19. The conical inner circumference 19 narrrows from the back toward the front end. On the back end, that is, the end of the anchoring socket 16 having the largest diameter, four internally threaded blind bores 22 are distributed uniformly over the circumference, and stay bolts 24 surrounded by spacer sleeves 23 are screwed into them. The bolts 24 hold a perforated back template 26 at the appropriate distance from the end of the anchoring socket 16 such that it can be removed and replaced. A front perforated template 27 is inserted with its retaining ring 28 into the front end region of the anchoring socket 16.

Figure 6:
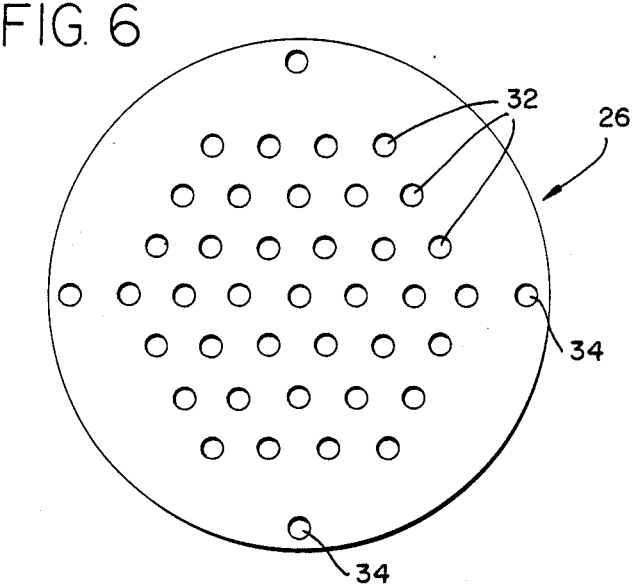
FIG. 6 is a plan view on the back perforated template taken along the arrow VI of FIG. 4.
Figure 7:
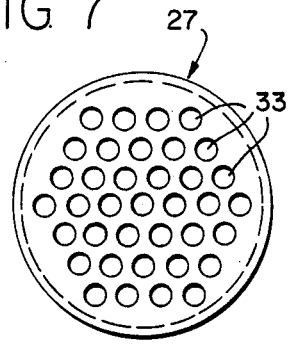
FIG. 7 is a plan view on the front perforated template taken along the arrow VII of FIG. 4.
Figure 9:
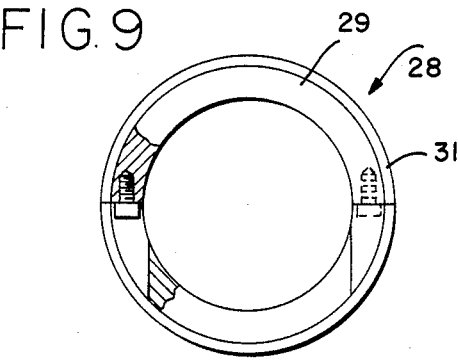
FIG. 9, in a partially cutaway bottom view taken along the arrow IX of FIG. 4, showing a retaining ring for the front perforated template.

As shown in FIG. 9, the retaining ring 28 is embodied in two parts and has an inner, undercut annular groove 29 at its inner end, in which, when the two parts of the retaining ring have been screwed together, the front perforated template 27, provided with a corresponding oblique rim, is retained firmly. The outer circumference 31 of the retaining ring 28 is conical, the cone selected being identical to the inner cone 19 of the anchoring socket 16, so the arrangement comprising the front perforated template 27 and retaining ring 28 cannot fall out of the anchoring socket 16 at the front. The dimensions are furthermore selected such that the front end face of the retaining ring 28 is flush with the front end face of the anchoring socket 16, and that the front perforated template assumes the intended position in the socket, acting as the front seal of the pouring area. As shown in FIGS. 6 and 7, the two perforated templates 26 and 27 have thirty-seven through bores 32 and 33, respectively, corresponding in number to the number of wires 13 of the parallel-wire bundle 12. The spacing of the through bores is selected in accordance with the intended uniform spacing, to be described below, of the wires 13 of the spread-apart end 14 of the wire bundle 12 and the outer circumference or envelope of which has the shape of a hexagon. Furthermore, the back perforated template 26 has four outer bores 34 distributed over the circumference, through which the stay bolts 24 pass.

Figure 5:
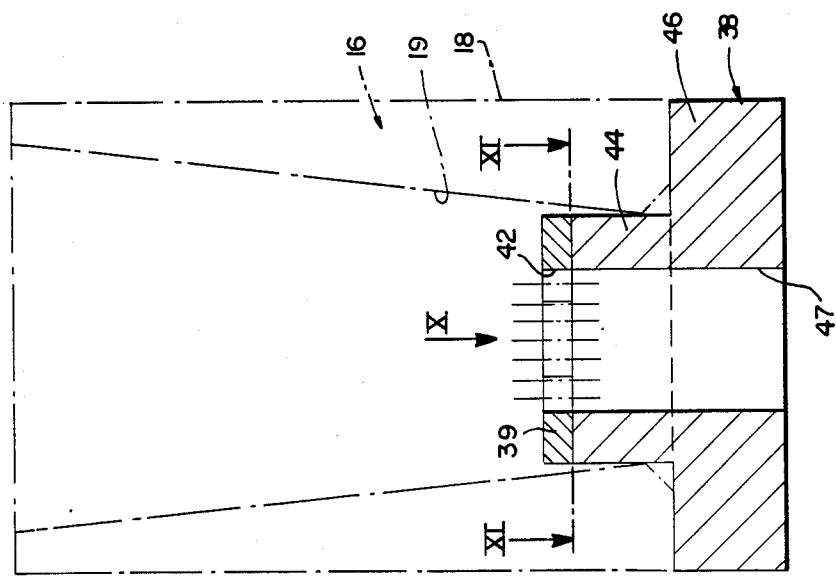
FIG. 5 is a longitudinal section taken through a reusable twisting clamp of the apparatus of FIG. 1.
Figure 10:
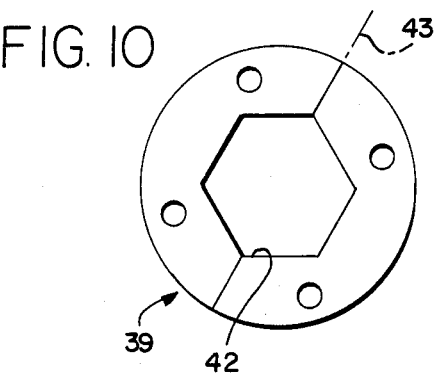
FIG. 10 is a plan view along the arrow X of FIG. 5 upon the twisting clamp.
Figure 11:
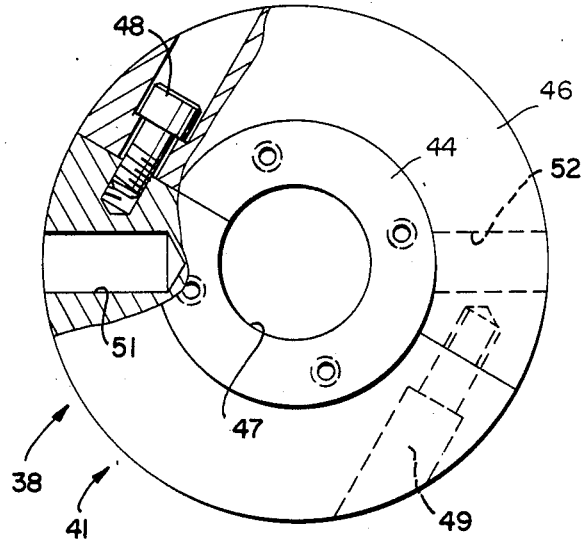
FIG. 11 is a partially cutaway section taken through the twisting clamp along the line XI—XI of FIG. 5.

The anchoring apparatus 11 according to the invention also has a twisting or stranding clamp 38, which is reusable and is shown in detail in FIGS. 5, 10 and 11. The clamp 38 comprises two interlocked elements of two parts each, which in particular are screwed together, specifically an annular wrench plate 39 and a flanged twisting plate 41. The wrench plate 39 has a cylindrical outer circumference and a hexagonal recess 42, the wrench size of which corresponds to the hexagonal configuration of the parallel-wire bundle in FIG. 8. The wrench plate 39 is divided in two along a line 43 which passes through two opposite corners of hexabonal recess 42. The flanged twisting plate 41 has a collar 44, on which the wrench plate 39 can be secured and the outer circumference of which corresponds to that of the wrench plate 39. A flanged portion 46, which is thus in one piece. of the twisting plate 41 has an outer circumference of larger diameter than the collar 44. Both parts 44 and 46 have the same coaxial or concentric inner bore 47, the inside diameter of which is somewhat larger than the wrench size of the hexagonal recess 42. The twisting plate 41 too is divided in two in the longitudinal direction; the two parts can be joined by means of a tangential screw connection 48, 49. The twisting plate 41 further has radial blind bores 51, 52 at two diametrically opposed points in the area of the flanged part 46, into which a tool can be inserted or appied for rotating the twisting clamp 38.

Anchoring each end of a parallel-wire bundle 12 of this kind with the aid of the apparatus 11 according to the invention is accomplished as follows: At a defined distance from the ends of the hexagonal parallel-wire bundle 12, the twisting clamp 38 is put in place, and by reason of its shape the bundle 12 is positively held in the circumferential direction in the hexagonal recess 42 of the wrench plate 39. The anchoring socket 16 is pushed over this end of the bundle 12 with its narrower end first. The twisting clamp 38 is then rotated in a cirumferential direction, while the other end of the parallel-wire bundle 12 is either held firmly or likewise rotated, but in the opposite direction, by another twisting clamp 38 not shown. As a result, the parallel-wire bundle 12 is twisted between the two twisting clamps 38, or between the twisting clamp 38 and some other retention point; the intent is to attain a specific, defined lay length. The end area of the parallel-wired bundle 12 guided through the anchoring socket 16 is opened up during this untwisting operation, causing the individual wires 13 of this end 14 of the bundle to spread out in a conical pattern; the angle of spread of the associated individual wires 13 is dependent on its position inside the hexagonal arrangement of the wire bundle 12. In other words, the individual wires 13 located in the longitudinal axis remain in the longitudinal axis, while the individual wires located farther away open into a conical pattern by an angle that increases progressively from the axis outward. The lay length of the twisted or portion is selected such that the outermost individual wires 13 of the hexagonal bundle 12 are spread out to a cone the angle of which corresponds to that conical angle at which the conical inner wall 19 of the anchoring socket 16 extends. During the opening of the end of the wire bundle 12 to form the spread-apart end 14, the anchoring socket 16 rests on the twisting clamp 38 in the position shown in FIG. 5. In an intermediate state during the twisting, the individual wires 13 are threaded into the through bores 33 of the front perforated template 27, which is joined to the retaining ring 28. The front perforated template 27 is pushed to its location defined by the spacing of the individual wires 13 at the spread-apart end 14 of the bundle.

Then the anchoring socket 16 is pushed toward the rear, out of the position shown in FIG. 5, in such a manner as to arrive at the position shown in FIGS. 1 and 4, in which the anchoring socket 16 slides over the arrangement comprising the front perforated template 27 and the retaining ring 28, so that the retaining ring 28 is held at the front end of the socket 16 in the manner of a conical seat. Then the spread-apart ends of the individual wires 13 are threaded into the bores 32 of the back perforated template 26, which then is held firmly at the back end of the anchoring socket 16 by means of the stay bolts 24 and is held spaced apart by means of the spacer sleeves 23. This is the arrangement shown in FIG. 4 and FIG. 1.

Figure 3:
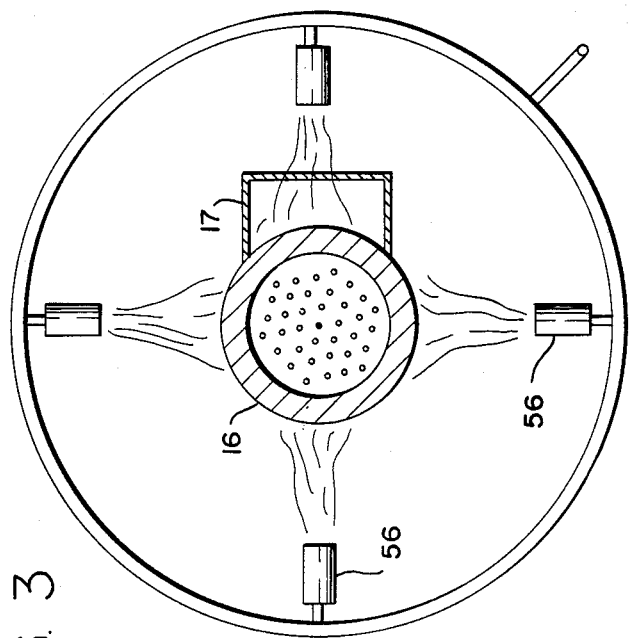
FIG. 3 is a schematic sectional view taken along the line III—III of FIG. 1.

Since the individual wires 13 are kept spaced apart by a definite distance in the vicinity of the cable head that is now to be produced, and the individual wires 13 spread out uniformly in a conical pattern in straight lines, without bending, because of the twisting of the remaining area of the bundle, the casting material can now be introduced in the direction of the arrows A in FIGS. 1 and 2 into the anchoring socket 16; during this process, the front perforated template 27, with its retaining ring 28, acts as a sealing element for the viscous casting material that is to be poured in. It will be understood that the metallic casting material is introduced into the anchoring socket 16 in the upright position shown in FIG. 1. The casting material to be introduced is a zinc alloy, for example, which is heated to a predetermined pouring temperature and introduced in liquid form; a temperature of approximately 450° C. on the part of the socket 16 is maintained by four gas burners 56 (one of which passes through an opening of the structural part 17), distributed uniformly over the circumference of the socket as shown in FIGS. 1 and 3. Either along with or prior to the introduction of the zinc alloy as casting material, a flux is used which is matched to the pouring temperature and to the steel alloy of the wire bundle 12. Enough casting material is introduced that a cast body 57 of a predetermined height is produced, the height being dependent on the dimensions of the socket 16, but showing a maximum of 1.5 to 1 in proportion to the average outer diameter. As a result, a conical cast body 57 is attained which is relatively short (extending, for example, as far as the line 58 in FIG. 1) and relatively wide, so that in the working load range it enables an elastically resilient support of the individual wires 13 of the wire bundle 12, without being able itself to move relative to the individual wires 13.

Once the casting material has been set, however, the back perforated template 26 is unscrewed and unthreaded first, so that it can be used again for some other anchoring of an end of a cable or wire bundle. The same applies to the stay bolts and the spacers. Then, the anchoring socket 16 is pushed back into the position upon the twisting clamp 38 shown in FIG. 5, so that the cast body 57 is freed from out of the anchoring socket 16. Now the retaining ring 28 is unscrewed into its two parts and removed from the front perforated template 27 or from the cast body 57, so that this retaining ring 28 too can be reused for anchoring another cable or wire bundle. Then the anchoring socket 16 is pushed back over the cast body or cone 57 (FIG. 1) and can then be secured to some stationary structural part where it is to be mounted. After that, the twisting clamp 38 can also be removed from the laid parallel-wire bundle 12 and reused.

Although the method for anchoring a cable or wire bundle of highly-tensile steel wire has been described herein in conjunction with a parallel-wire bundle 12, it will be understood that the same method and the same apparatus can also be used for parallel-strand bundles and for spiral cables or similar cables. In the case of spiral cables or twisted cables, the end that is to be anchored is opened up in such a manner that it has the conically spread-apart shape of the individual wires or strands that is shown in the drawings.

What is claimed is:

1. An apparatus for anchoring cables, bundles of wires or strands, or the like, of preferably high-tensile steel wire comprising:
   at least one fixed anchoring socket having a front end and a back end and including an inner surface defining a cone, wherein an associated end of the cable or bundle is twisted open such that it forms a cone approximately identical to the cone defined by the inner surface of the anchoring socket;

a metallic cast body inserted between the opened or spread-apart wires or strands; and a perforated template disposed on the front end of the anchoring socket into which the spread-apart wires or strands can be threaded.

2. The apparatus as defined in claim 1, further comprising:

a reusable twisting clamp for twisting and opening the cable or bundle.

3. The apparatus as defined in claim 2, wherein the twisting clamp includes an upper ring with an hexagonal recess for receiving the bundled wire or strand.

4. The apparatus as defined in claim 2, wherein the twisting clamp is inserted and mounted within the front end of the anchoring socket at the smaller diameter portion of the cone.

5. The apparatus as defined in claim 1, further comprising:

a reusable ring for retaining the template in the anchoring socket.

6. The apparatus as defined in claim 5, wherein the reusable ring comprises a two-part ring.

7. The apparatus as defined in claim 1, wherein the template forms a pouring seal for the anchoring socket.

8. The apparatus as defined in claim 7, further comprising:

a reusable ring for retaining the template in the anchoring socket.

9. The apparatus as defined in claim 8, wherein the reusable ring comprises a two-part ring.

10. The apparatus as defined in claim 1, further comprising:

a perforated template disposed on the back end of the anchoring socket into which the spread-apart wires or strands can be threaded.

11. The apparatus as defined in claim 10, further comprising:

stay bolts for retaining the perforated template on the anchoring socket.

12. The apparatus as defined in claim 1, wherein the cast body defines a cast cone and wherein the ratio of the height to the mean outside diameter of the cast cone is approximately 1.5 to 1 or less, by reason of the controlled uniform wire spacing and thus a controlled and uniform grip of the wire inside the cast cone.

13. A method of anchoring cables, bundles of parallel or stranded wires, or the like, of preferably high-tensile steel wire, using an anchoring socket having a conical inner region, and reversible twisting clamp, holding means and at least one perforated template, comprising the steps of:

introducing at least one end of the cables, bundles of parallel or stranded wires, or the like into the fixed anchoring socket;

holding the cables, bundles of parallel or stranded wires, or the like about their circumference at spaced locations by the holding means and the reversible twisting clamp;

twisting the cables, bundles of parallel or stranded wires, or the like by rotating the twisting clamp relative to the holding means until the cable, bundles of parallel stranded wires, or the like introduced into the anchoring socket are opened and in such a manner that the wires or strands extend uniformly through the conical inner region of the anchoring socket;

holding the wires or strands of the open end of the cable or bundle of parallel or stranded wires spaced apart for the pouring step by at least one perforated plate; and pouring a metallic casting material into the opened wires or strands such that a direct metal-to-metal joint is established between the metallic casting material and the wires or strands of the cable or bundle.

14. The method as defined in claim 13, further comprising the step of:

zinc-coating the surface of the wire or strand, and wherein a flux matched to the pouring temperature and a metallic casting material are used.

15. The method as defined in claim 14, wherein the metallic material is zinc alloy.

* * * * *